J. C. MIRES.
UNDERGROUND CONDUIT FOR ELECTRIC RAILWAYS.
APPLICATION FILED AUG. 24, 1910.

1,014,892.

Patented Jan. 16, 1912.

2 SHEETS—SHEET 1.

Witnesses:

Inventor
John C. Mires
By Geo. H. Strong.
His Attorney.

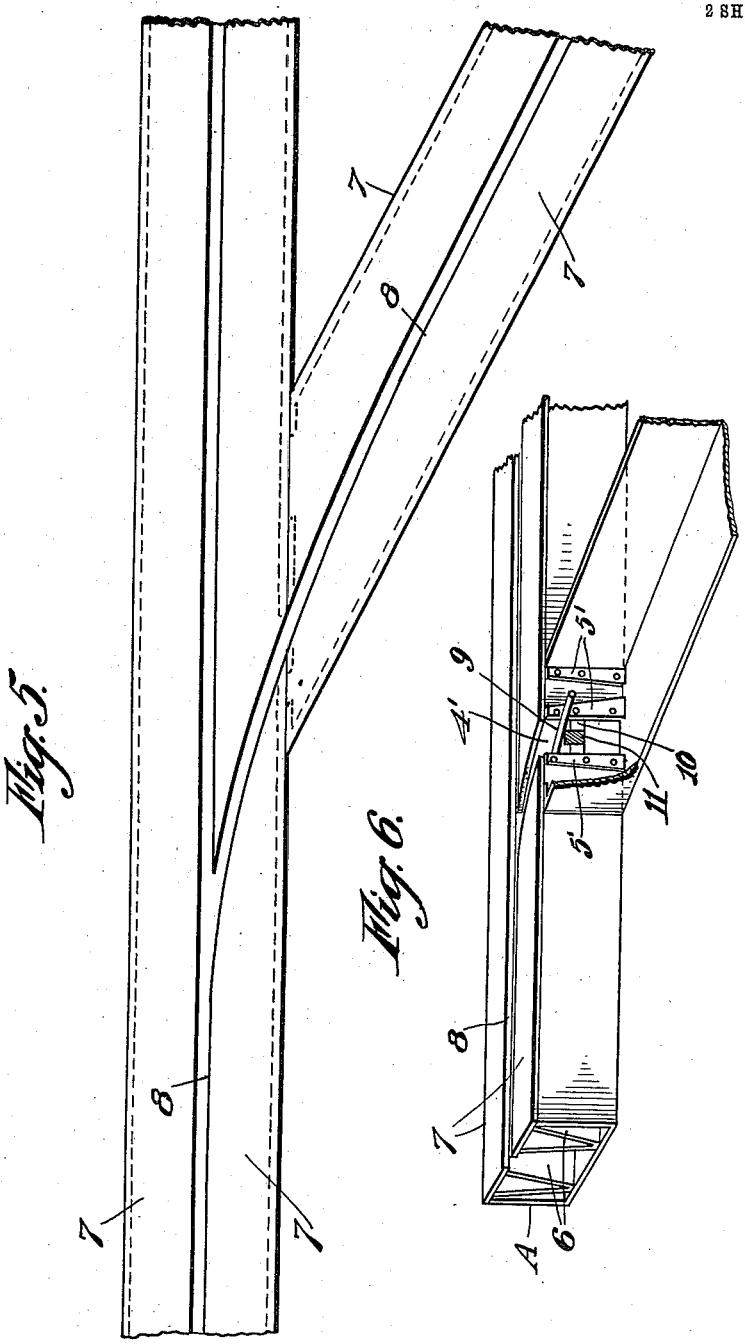

UNITED STATES PATENT OFFICE.

JOHN C. MIRES, OF OAKLAND, CALIFORNIA.

UNDERGROUND CONDUIT FOR ELECTRIC RAILWAYS.

1,014,892.  Specification of Letters Patent.  Patented Jan. 16, 1912.

Application filed August 24, 1910. Serial No. 578,739.

*To all whom it may concern:*

Be it known that I, JOHN C. MIRES, a citizen of the United States, residing at Oakland, in the county of Alameda and State of California, have invented new and useful Improvements in Underground Conduits for Electric Railways, of which the following is a specification.

This invention relates to conduits for trolley cables and particularly pertains to an underground conduit for the trolley wires of electric railways.

It is the object of this invention to provide a conduit for underground electric trolley wires and the like which is simple in construction, economical in manufacture and which is adapted to be installed between the rails of the ordinary street railways at comparative small cost per mile.

A further object is to provide a conduit of the above nature which is so constructed as to admit of easy access to its interior for the purpose of cleaning the conduit or making repairs, and which is so designed as to permit of it being installed on a road-bed in sections.

A further object is to provide a trolley cable conduit which, though being formed of light material, is so built that it is capable of sustaining heavy loads, such as would be frequently imposed thereon when located in streets where heavy trucks and other vehicles travel.

The invention consists of the parts and construction and combination of parts as hereinafter more fully described and claimed having reference to the accompanying drawings, in which—

Figure 1:
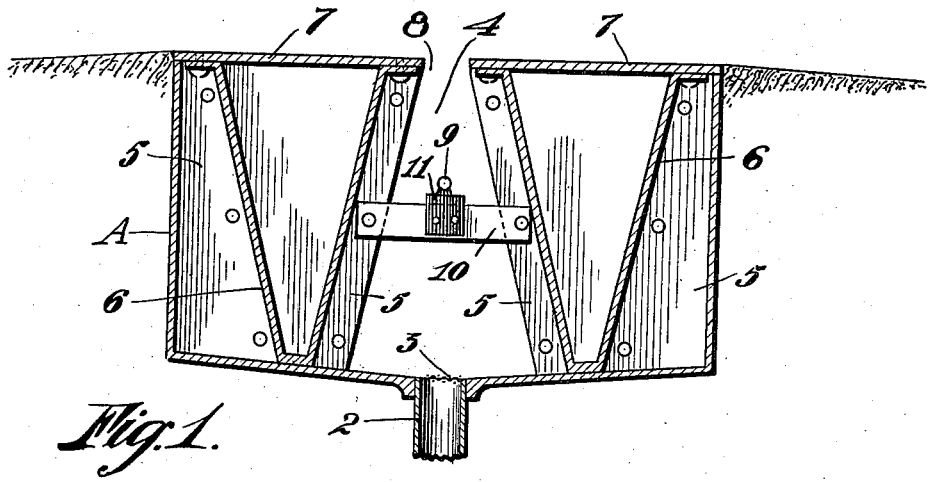
Figure 2:
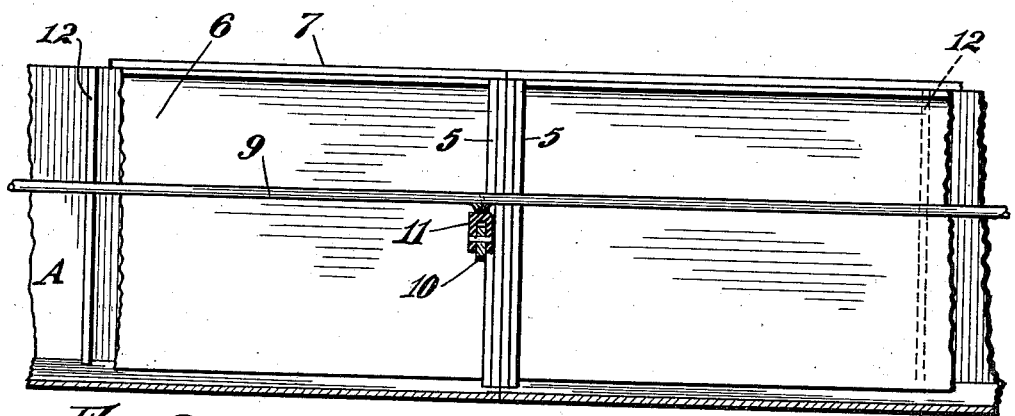
Figure 3:
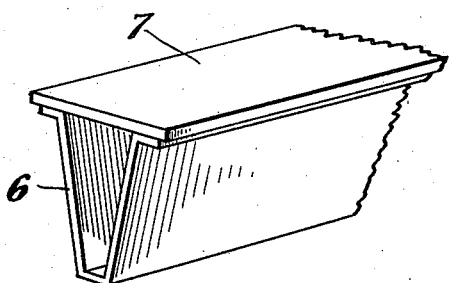
Figure 4:
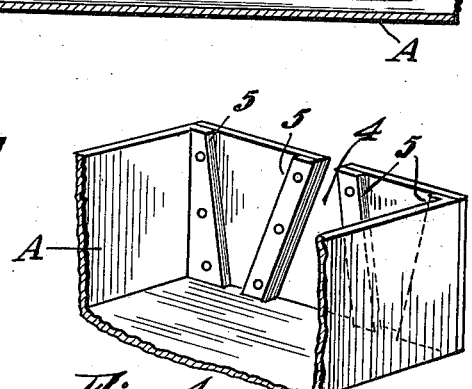

Figure 1 is a cross section of the invention. Fig. 2 is a longitudinal section. Fig. 3 is a perspective view of a portion of a cover or top plate. Fig. 4 is a perspective view of an end portion of the conduit box. Fig. 5 is a plan view showing the manner of connecting a branch conduit. Fig. 6 is a perspective view of same with portions removed.

In the drawing A represents the conduit box or trough of suitable size, shape and material. Preferably, it is formed of sheet metal and is built in sections of about eight feet in length and two in width, so as to fit a trough between the track rails and be easily handled. These box sections A have vertically disposed sides and a bottom which inclines slightly from each side to the center, as shown in Fig. 1, so as to facilitate the draining of the box through a drain pipe 2 disposed in the bottom of the box at any convenient point in its length, and which empties into a sewer pipe, or the like. The mouth of the drain pipe is covered with a screen or strainer 3. The top of each box A is open, and the ends, which are adapted to abut against the ends of adjacent boxes or sections of the conduit, are slotted as shown at 4, the slots 4 in each end of a box A extending from the bottom to the top of the box, so as to allow the trolley arm of the car to travel through the conduit. The inner faces of the ends are provided with oppositely inclined ribs 5 which are disposed in pairs on each side of the slot 4, and also adjacent the sides of the box, and are designed to receive the ends of tapered or wedge shaped wall sections 6 secured on the under side of cover plates 7. There are two of these wall sections 6 and cover plates 7 for each box, and between them they inclose the slot 8 and protect the trolley wire 9. The sections 6 are formed of sheet metal and extend the full length of the conduit box A and approximately the entire length of the cover plate 7, and are adapted to bear upon the bottom of the conduit box A throughout its length. The slot 8 registers with the slot 4 and is designed to register with a like slot on the adjacent conduit section, thus forming a continuous slot the length of the conduit system through which a trolley arm extending beneath a car may project. The trolley cable 9 is disposed in the conduit A parallel with the slot 8 and is supported above the bottom of the conduit by suitable means, as brackets 10, which are mounted on the inner faces of the ends of the conduit boxes A, and extend across the slots 4. A suitable insulating member 11 is interposed between the cable 9 and the bracket 10.

In the installing of the conduit boxes A, they are set end to end between the rails of a track-way and are suitably secured together. They may be embedded in concrete if desired, or be secured to the ties on which the rails of the track are supported. The conduit sections being of comparatively short lengths permit of their being easily handled. When a number of sections A are in place, the trolley cable may be mounted therein and finally the cover plates 7, each with its wall section 6, are placed in position. The cover plates 7 rest upon the conduit sections and upon the wall sections, as shown in Figs. 1 and 3, whereby any cover plate can be easily and quickly removed at any time to allow the conduit to be cleaned or the trolley wire to be reached in case of need.

A number of ribs 12 may be formed on the inner wall of the sides of the conduit box A, as indicated in dotted lines in Fig. 2, against which the outer side of the sections 6 may bear, thus adding rigidity and stability to the cover plates. Branch conduits may be intersected with another conduit where crossings or frogs occur, as shown in Figs. 5 and 6, by forming a slot 4' in the side of a conduit box A and providing ribs 5' on both sides of the slot in which the beveled ends of the side sections of the branch conduit may rest. The trolley slot 8 in such case would join with the slot of the branch line as shown in Fig. 5.

Having thus described my invention, what I claim and desire to secure by Letters Patent is—

1. In an underground conduit, the combination of the track rails of a series of boxes placed end to end between the track rails, each box provided with end seats and with cover members on each side of the trolley slot, and means carried by and removable with the cover and projecting into the box and constituting the walls of the conduit passage, said means comprising hollow sections having end portions removably fitting the seats in the ends of the boxes.

2. In an underground conduit, the combination of the track rails of a series of boxes placed end to end between the track rails, each box provided with cover members on each side of the trolley slot, and means carried by and removable with the cover and projecting into the box and constituting the walls of the conduit passage, said means comprising hollow sections angular in cross section, and means angularly arranged on the inside of the box conforming to and receiving the ends of the sections, said boxes each having inclined bottoms and a drain pipe connected therewith.

3. In a conduit, a box section therefor, a pair of cover members fitting the box and spaced from one another to provide a trolley slot, and wall sections depending from each cover and removable therewith constituting walls to inclose a slot space below the covers, and guides on the inner walls of the box forming seats for the ends of the wall sections.

4. In a conduit, a box section therefor, having V-shaped seats in the ends, a pair of cover members fitting the box and spaced from one another to provide a trolley slot, and means depending from each cover and removable therewith, constituting walls to inclose a slot space below the cover, said last named means comprising members which are substantially V-shaped in cross section, fitting said V-shaped seats in the ends of the boxes.

5. In a conduit, a box section therefor, having V-shaped seats in the ends, a pair of cover members fitting the box and spaced from one another to provide a trolley slot, and means depending from each cover and removable therewith constituting walls to inclose a slot space below the cover, said last named means comprising members which are substantially V-shaped in cross section, fitting said V-shaped seats in the ends of the boxes, the ends of said boxes having substantially A-shaped slots between said seats and open at the top and in continuation of the trolley slot and between the covers.

6. In a conduit, a box having seats in the ends, said box having V-shaped sections with cover members secured thereto and spaced from one another to provide a trolley slot, each of said V-shaped sections being independently removable from the box and fitting the seats in the ends of the box.

7. A conduit composed of a series of box-like sections placed end to end with registering end slots, removable wall sections constituting the slot and forming a housing for a trolley cable for each box, said box having seats for an intersecting conduit and an intersecting conduit of similar construction, the adjacent end box of said intersecting conduit fitting the seats on the sides of the box of the conduit intersected, said intersected box cut away in continuation of the intersecting conduit, said intersecting conduit having removable wall sections constituting the slot.

In testimony whereof I have hereunto set my hand in the presence of two subscribing witnesses.

JOHN C. MIRES.

Witnesses:
  CLARENCE M. REED,
  J. M. KELLEY.

---

Copies of this patent may be obtained for five cents each, by addressing the "Commissioner of Patents, Washington, D. C."